United States Patent [19]

Kumazawa et al.

[11] Patent Number: 5,849,383
[45] Date of Patent: Dec. 15, 1998

[54] MINUTE STRUCTURE FOR SHOWING COLORS BY REFLECTION AND INTERFERENCE OF NATURAL LIGHT

[75] Inventors: Kinya Kumazawa, Yokosuka; Hiroshi Tabata, Yokohama; Junichi Takimoto, Yonezawa, all of Japan

[73] Assignee: Nissan Motor Co., Ltd., Kanagawa, Japan

[21] Appl. No.: 480,568

[22] Filed: Jun. 7, 1995

[30] Foreign Application Priority Data

Jun. 7, 1994 [JP] Japan .................................. 6-125412

[51] Int. Cl.$^6$ ...................................................... B44C 5/08
[52] U.S. Cl. .............................................. 428/38; 428/913
[58] Field of Search ....................................... 428/38, 913

[56] References Cited

U.S. PATENT DOCUMENTS

| | | |
|---|---|---|
| 4,514,459 | 4/1985 | Nakagawa et al. . |
| 5,407,738 | 4/1995 | Tabata et al. . |
| 5,472,798 | 12/1995 | Kumazawa et al. ...................... 428/69 |

FOREIGN PATENT DOCUMENTS

| | | |
|---|---|---|
| 0 491551 | 6/1992 | European Pat. Off. . |
| 0 540215 | 5/1993 | European Pat. Off. . |
| 43-14185 | 6/1968 | Japan . |
| 56-144219 | 11/1981 | Japan . |
| 59-228042 | 12/1984 | Japan . |
| 59-228052 | 12/1984 | Japan . |
| 60-24847 | 6/1985 | Japan . |
| 62-170510 | 7/1987 | Japan . |
| 1-139803 | 6/1989 | Japan . |
| 7-34324 | 2/1995 | Japan . |

OTHER PUBLICATIONS

Derwent Publications Ltd., London, GB; Class F06, AN 91–145656 XP002017969 and JP-A-03 082 881 (Toray Ind. Inc.), Apr. 8, 1991, Abstract.

Derwent Publications Ltd., London, GB: Class A23, AN 94–186702 XP002017970 and JP-A-06 123 069 (Toray Ind. Inc.), May 6, 1994, Abstract.

*Seni Kikai Gakkaisi,* by Kiyoichi Matsumoto et al., vol. 42, No. 2, 1989, pp. 55–62.

*Seni Kikai Gakkaisi,* by Kiyoichi Matsumoto et al., vol. 42, No. 10, 1989, pp. 60–68.

*Primary Examiner*—Helen Lee
*Attorney, Agent, or Firm*—McDermott, Will & Emery

[57] ABSTRACT

The invention relates to a minute structure for showing an interference color having a certain wavelength within a visible light region, by reflection and interference of a natural light incident on the minute structure. The minute structure has: a laminated portion including a plurality of first layers having a first refractive index and a plurality of second layers having a second refractive index different from the first refractive index; and a stray-light absorbing member. The first and second layers are alternately placed on top of each other. The stray light has wavelengths other than the certain wavelength and is formed by transmittance of the natural light through the laminated portion, reflectance of the natural light by the laminated portion and/or scattering of the natural light by the laminated portion. The invention further relates to a fabric for showing the interference color. The fabric includes: a first thread which is one of a warp and a weft; and a second thread which is the other of the warp and the weft. The first and second threads are woven to form the fabric. The first thread is made of a material containing the laminated portion. The second thread is made of a material containing the stray-light absorbing member. By the provision of the stray-light absorbing member, the interference color becomes brighter and deeper and higher in value.

16 Claims, 8 Drawing Sheets

MINUTE STRUCTURE FOR SHOWING COLORS BY REFLECTION AND INTERFERENCE OF NATURAL LIGHT

BACKGROUND OF THE INVENTION

1. Field of the Invention

The present invention relates to a minute structure for showing colors by reflection and interference of natural light, which is used as fibers and chips for textiles and coatings.

2. Description of the Prior Art

Hitherto, there have been proposed inorganic or organic pigments and metallic powders or chips for providing various fibers and coatings with desired colors and improved external appearances. Recently, there have been increasing demands for fibers and coatings which have colors varying with a change of angle of viewpoint and having high chromas, high quality and elegance. For satisfying these demands, there have been several proposals of materials or structures showing deep and bright colors by reflection and interference of natural light. For example, SENI KIKAI GAKKAISI, Vol. 42, No. 2, pp. 55–62 (1989) discloses a laminated photo-controllable coloring film for showing colors by interference of light. This film is composed of one layer of molecular orientation anisotropic polymer film and two layers of polarizing films, or one polarizing film and one reflective film. JP-A-59-228042 and U.S. Pat. No. 4,514,459 disclose flat fibers of a woven fabric. These publications define, for example, a cross sectional configuration of the flat fibers and the angle of inclination of the flat fibers relative to the surface of the fabric at portions other than formation points of the fabric. JP-B-60-24847 discloses similar flat fibers of a woven fabric as those of the above two publications. The flat fibers disclosed in JP-B-60-24847 are made of polyester and have iridescence. JP-A-62-170510 discloses fibers which have an interference color by forming numerous slits in parallel with the axis of the fibers, on the surface of the fibers. U.S. Pat. No. 5,407,738 and JP-A-7-34324 disclose minute structures for showing very bright colors by reflection and interference of natural light.

SUMMARY OF THE INVENTION

It is an object of the present invention to provide a minute structure for showing colors by reflection and interference of natural light, which colors are very bright and very elegant and have special tones.

According to a first aspect of the present invention, there is provided a minute structure for showing an interference color having a certain wavelength within a visible light region, by reflection and interference of a natural light incident on the minute structure, said structure comprising:

a laminated portion for showing the interference color, said laminated portion including a plurality of first layers having a first refractive index and a plurality of second layers having a second refractive index different from the first refractive index, said first and second layers being alternately placed on top of each other; and means for absorbing a stray light, said stray light having wavelengths other than the certain wavelength and being formed by transmittance of the natural light through said laminated portion, reflectance of the natural light by said laminated portion and/or scattering of the natural light by said laminated portion.

According to a second aspect of the present invention, there is provided a fabric for showing an interference color having a certain wavelength in a visible light region, the fabric comprising:

a first thread which is one of a warp and a weft, the first thread having the laminated portion of the first aspect of the present invention for showing the interference color; and a second thread which is the other of the warp and the weft, the first and second threads being woven to form the fabric, the second thread having the stray-light absorbing means of the first aspect of the present invention.

According to the present invention, when natural light is incident on the minute structure, an interference light having a certain desired wavelength within the visible light region is reflected from the minute structure.

In the present invention, it is inevitable to have some dispersions in the thicknesses of the first and second layers, in the crystallinity of materials for preparing the first and second layers and in the like, the wavelength dependences of refractive index and absorbance, and the like. With these inevitable factors, the natural light incident on the minute structure is transmitted through the laminated portion, is refracted by the laminated portion, and/or is scattered by the laminated portion. The thus formed transmitted, refracted and scattered lights are classified into the above-mentioned stray light.

In the invention, the stray light is substantially eliminated by the provision of the stray-light absorbing means. With this, as is exemplified in FIGS. 16–17, the baseline of the reflectance spectrum becomes substantially low, and a so-called shoulder portion and/or a so-called tail portion of the reflectance spectrum can be substantially eliminated. Therefore, the interference color from the minute structure becomes very bright and very deep and very high in value.

DESCRIPTION OF THE PREFERRED INVENTION

With reference to FIGS. 1–17, a minute structure for showing interference colors by reflection and interference of natural light, and a fabric including the minute structure will be described in accordance with the present invention in the following.

Figure 1:
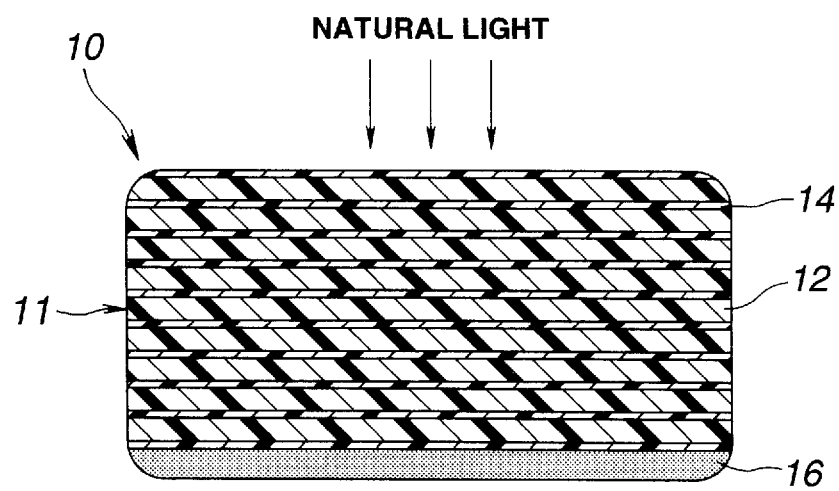
FIG. 1 is a view showing a rectangular section of a minute structure having a stray-light absorbing member at a bottom thereof, according to the present invention.
Figure 2:
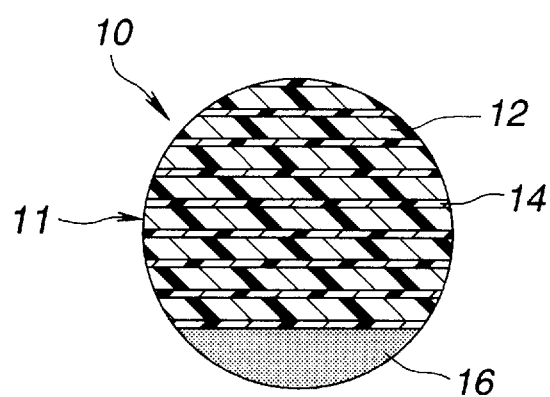
FIG. 2 is a view similar to FIG. 1, but showing another minute structure having a circular section.
Figure 3:
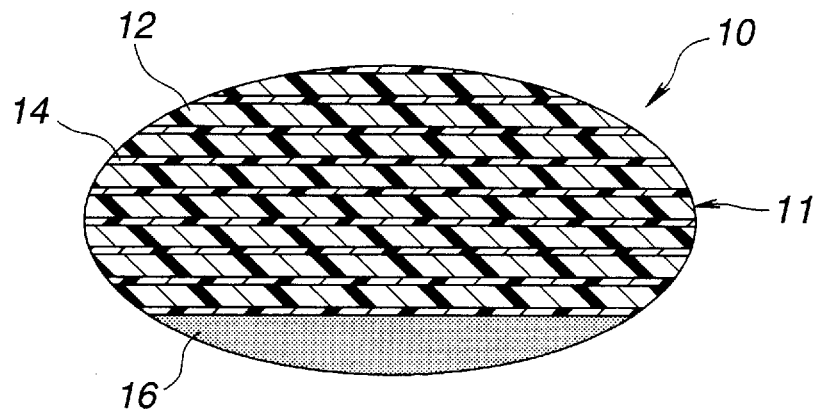
FIG. 3 is a view similar to FIG. 1, but showing another minute structure having an elliptical section.
Figure 4:
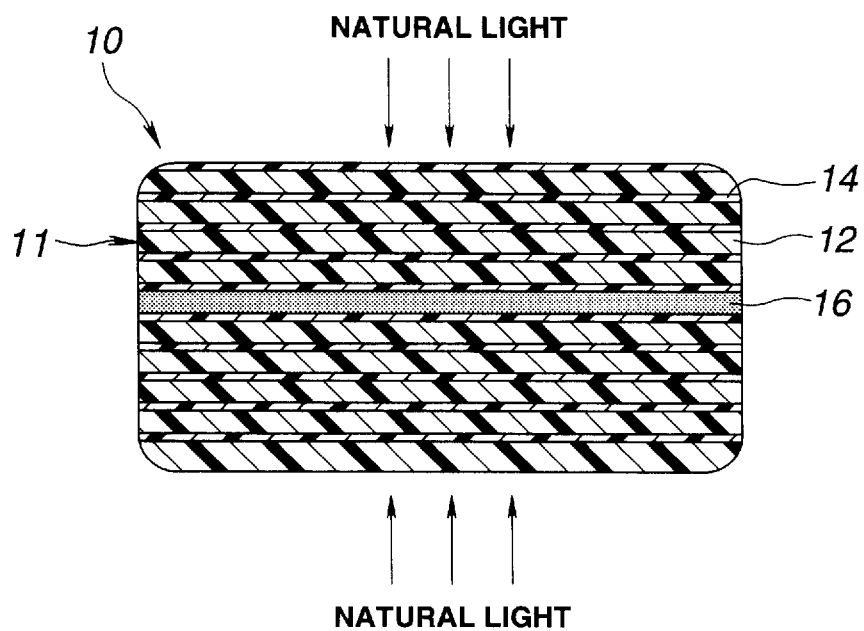
FIG. 4 is a view similar to FIG. 1, but showing another minute structure having the stray-light absorbing member at a middle thereof.
Figure 5:
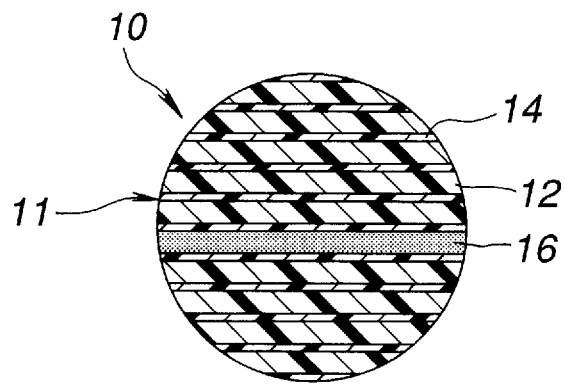
FIG. 5 is a view similar to FIG. 4, but showing another minute structure having a circular section.
Figure 6:
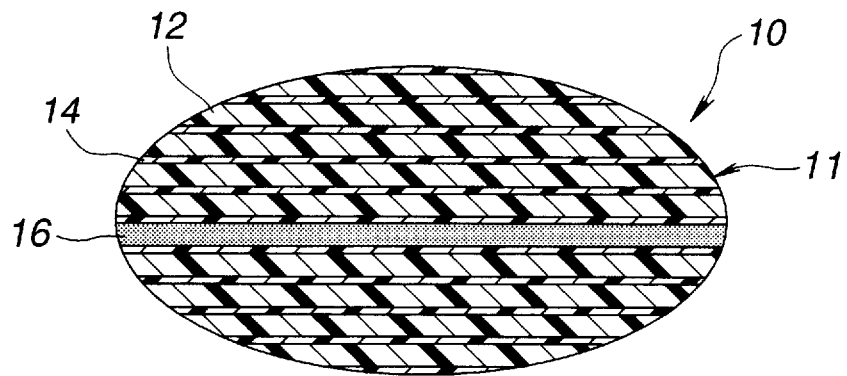
FIG. 6 is a view similar to FIG. 4, but showing another minute structure having an elliptical section.
Figure 7:
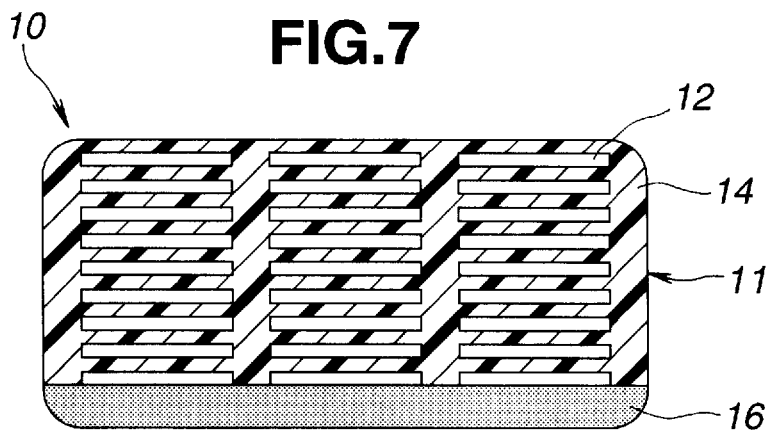
FIG. 7 is a view similar to FIG. 1, but showing another minute structure having a plurality of solid layers and a plurality of layers of void spaces filled with air, which are alternately placed on top of each other.

As is seen from FIG. 1, there is provided a minute structure 10 of the present invention. This minute structure 10 comprises a laminated portion 11 including a plurality of first layers 12 and a plurality of second layers 14, which first and second layers 12, 14 are alternately placed on top of each other. As is shown in FIGS. 1–6, each of the first layers 12 may be made of a solid object such as plastic and each of the second layers 14 may be made of another solid object such as plastic. However, as is shown in FIGS. 7–11, each first layer 12 may be filled with air (i.e. the first layer is a vacant space filled with air) and each second layer 14 may be made of a solid object, The first and second layers are different in refractive index. That is, one of the, first and second layers is made of a low-refractive-index material and the other of the first and second layers is made of a high-refractive-index material. In fact, in case that the low-refractive index material is air (its refractive index is 1.0), it is preferable that the high-refractive-index material has a refractive index within a range from 1.2 to 1.8, as disclosed in U.S. Pat. No. 5,407,738. As further disclosed therein, it is preferable that the width, or thickness, of the air space ranges from 0.02 $\mu$m to 0.4 $\mu$m. In case that both of the low-refractive-index material (its refractive index is "na") and the high-refractive-index material (its refractive index is "nb") are made of solid objects, it is preferable, that "na" is at least 1.3 and that "nb/na" is within a range from 1.1 to 1.4, as is disclosed in JP-A-7-34324.

Examples of the low-refractive-index material are air, polypropylene (PP) and polyvinylidene fluoride (PVDF). Examples of the high-refractive-index material are polyethylene terephthalate (PET) and polyphenylene sulfide (PPS). Further examples of the low- and high-refractive-index materials are polyester, polyacrylonitrile, polystyrene (PS), nylon, polypropylene, polyvinyl alcohol, polycarbonate, polymethyl methacrylate, polyether ether ketone and polyparaphenylene terephthalide.

As is mentioned hereinabove, a minute structure of the present invention comprises a laminated portion including first and second layers which are different in refractive index and alternately placed on top of each other. With this, the minute structure shows interference colors having wavelengths in the visible light region, by reflection and interference of natural light incident on the minute structure. A minute structure which is similar to that of the present invention is disclosed in U.S. Pat. No. 5,407,738 of which disclosure is incorporated herein by reference.

It is an important feature of the present invention that the minute structure includes a stray-light absorbing member for absorbing and thus eliminating the stray light having wavelengths other than the wavelength of the objective interference color. The minute structure 10 shown, for example, in FIG. 1 has a layer of this stray-light absorbing member 16 at the bottom of the minute structure 10. The position of the layer of the stray-light absorbing member in the minute structure is not particularly limited, as long as the stray-light absorbing member does not impede the formation of interference color. As is shown in FIGS. 1–3 and 7–9, it is preferable to position the stray-light absorbing member at the bottom of the minute structure, in view of the elimination of the stray light. However, as is shown in FIGS. 4–6 and 10–11, the layer of the stray-light absorbing member 16 may be positioned at the middle of the minute structure 10. In this case, the interference light is sufficiently formed by the minute structure and the stray light is sufficiently absorbed by the stray-light absorbing member 16 even if the minute structure 10 is twisted or kinked. In fact, each minute structure 10 shown in FIGS. 4–6 and 10–11 is almost symmetrical about the layer of the stray-light absorbing member. With this, it is possible to make the minute structure form the interference light even if natural light is incident on the minute structure in either of the two opposite directions along the arrows which are shown, for example, in FIG. 4.

It is preferable to select a material for the stray-light absorbing member, from a group which can absorb the stray light having a wide range of wavelength. In view of this, it is preferable to use the stray-light absorbing member having a dark color or a black color. Examples of the material for the stray-light absorbing member are colored polymer resins such as polyimide, polymer resins which are mixed with organic and inorganic pigments having dark colors or black colors (e.g. melanine, aniline black and carbon black), polymer resins which are coated with ceramics having dark colors or black colors, and polymer resins which are coated with paints having dark colors or black colors.

By the provision of the stray-light absorbing member, the color of interference light formed by the minute structure becomes very bright and very deep and substantially high in value. In the invention, this value (Y) of color is according to CIE (International Commission on Illumination) standard colorimetric system. The thickness, the amount and the like of the stray-light absorbing member in the minute structure are not particularly limited to certain ranges, but may vary depending on the type of material for the stray-light absorbing member. However, we unexpectedly found that the degree of absorption of the stray light increases by decreasing the average transmittance, in the visible light region (380–780 nm in wavelength), of the stray-light absorbing member. In fact, as is exemplarily shown in FIG. 12, with respect to the minute structure showing a green color as the interference color and thus having the reflection peak within a range from about 500 to about 560 nm in wavelength, when the average transmittance, in the visible light region of the stray-light absorbing member is at least 60%, the value of interference light from the minute structure become less than 40%. This result is almost the same as a case in which the stray-light absorbing member is omitted in the minute structure. When the average transmittance of the stray-light absorbing member becomes not higher than 50%, the value of the interference color exceeds 40%. In this range of the average transmittance, as the average transmittance becomes lower, the value (Y) becomes substantially higher. When the average transmittance becomes about 20%, the value becomes as high as 70%. Thus, in the invention, the average transmittance, in the visible light region, of the stray-light absorbing member is preferably within a range not higher than 50% and more preferably within a range not higher than 30%, for the purpose of absorbing the stray-light and thus making the value of interference color higher.

It is optional to weave threads or fibers, which are made of a first material containing the laminated portion of the invention, and threads or fibers, which are made of a second material containing the stray-light absorbing member of the invention, into a fabric. It is optional to use the minute structure having the laminated portion and the stray-light absorbing member, for each of the first and second materials. Thus, one of the warp and the weft of the fabric may be made of the first material containing the laminated portion, and the other of the warp and the weft of the fabric may be made of the second material containing the stray-light absorbing member. By selecting a suitable combination of the warp and the weft, it is possible to form an interference color which is very deep, bright and elegant.

Figure 13:
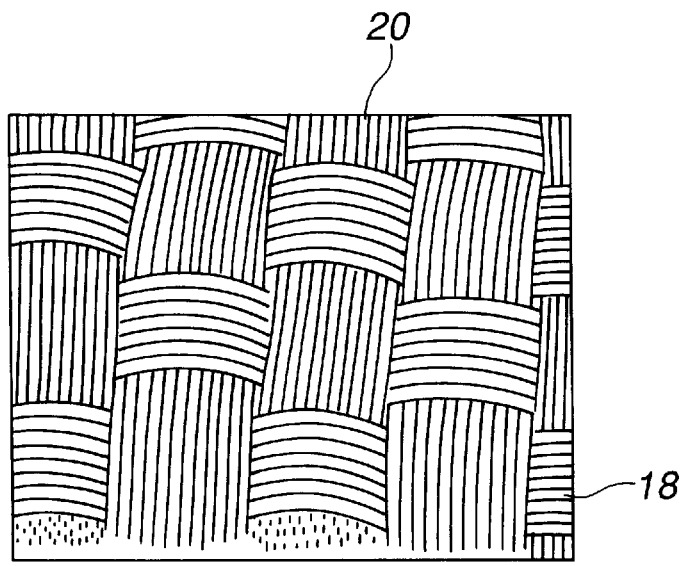
FIG. 13 is an enlarged schematic plan view showing a plain weave fabric, using the warp comprising the laminated portion and the weft comprising the stray-light absorbing member.

FIG. 13 shows an example of the minute structure of the present invention in the form of plain weave fabric. This fabric is prepared by weaving the warp 18 made of only the laminated portion and the weft 20 made of only the stray-light absorbing member. However, it is optional to use the warp 18 made of only the stray-light absorbing member and the weft 20 made of only the laminated portion. The number of threads for the warp and weft may be arbitrarily selected in the preparation of the fabric. The way of preparing the fabric may be plain weave, twill weave, satin weave, leno weave or the like. Of these examples, plain weave is a preferable example because the minute structure is easily aligned relative to the direction of the incident light. With this, the value and brightness of the interference light becomes substantially high.

The above-mentioned fabric prepared by weaving the warp and the weft has first and second portions relative to the light incident on the fabric. In the following paragraph, so-called light conditions at the first and second portions will be described, in case that a thread 24 and a thread 26 which are respectively made of only the laminated portion and only the stray-light absorbing member are used, with reference to FIGS. 14–15.

Figure 14:
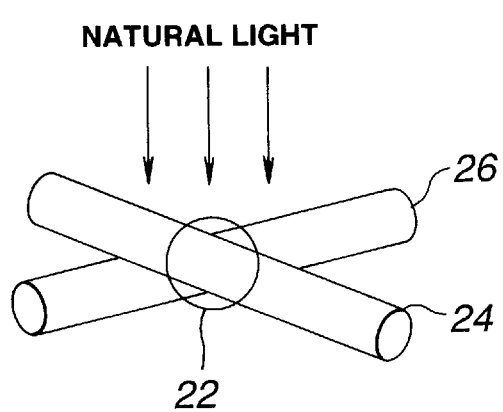
FIG. 14 is an enlarged schematic view showing an intersection of fabric, wherein a thread of the laminated portion is on a thread of the stray-light absorbing member.
Figure 15:
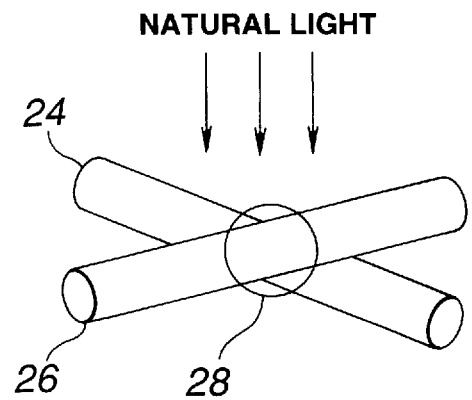
FIG. 15 is a view similar to FIG. 14, but showing another intersection of fabric, wherein the thread of the laminated portion is under the thread of the stray-light absorbing member.

As is schematically shown in FIG. 14, at each of the first portions 22, the thread 24 is on the thread 26. Thus, at the first portions 22, most of the incident light is reflected therefrom as the interference light. On the other hand, as is schematically shown in FIG. 15, at each of the second portions 28, the thread 26 is under the thread 24. Thus, at the second portions 28, most of the incident light is absorbed by the stray-light absorbing member. Therefore, the interference color is not shown at the second portions 28.

The present invention will be further described with reference to the following nonlimitative examples.

EXAMPLE 1

In this example, a minute structure according to the present invention which is similar to that shown in FIG. 8 was prepared as follows.

PET chips as a core material for preparing the laminated portion, PS chips as a sheath material, and PET chips containing a certain amount of carbon black for preparing the stray-light absorbing member were respectively put into first, second and third hoppers of a melt spinning machine. Then, all of these chips were melted and extruded at the same time from a single united nozzle having a special shape to prepare the minute structure as shown in FIG. 8, at a nozzle temperature of 280° C., to get one filament. Then, the extrusion (filament) was drawn, and then was allowed to stand still to cool down. Then, PS as the sheath material was removed by a solvent (methyl ethyl ketone). With this, the minute structure was obtained. Then, the extrusion was rolled round a reel at a rate of 7,000 m/min. As shown in FIG. 8, the thus prepared minute structure 10 had a base portion 30 and five minute units 32 (although three minute units in FIG. 8) formed on the base portion 30. The base portion 30 as the stray-light absorbing member 16 contained the certain amount of carbon black such that the average transmittance of the base portion in the visible light region (380–780 nm) was about 10%. Each minute unit 32 had six layers (although eight layers in FIG. 8) made of PET having a refractive index of 1.6 and six layers (void spaces) filled with air having a refractive index of 1.0, wherein these layers were alternately positioned on top of each other. Each layer of PET had a thickness of 0.08 $\mu$m and each layer filled with air had a thickness of 0.14 $\mu$m.

Figure 8:
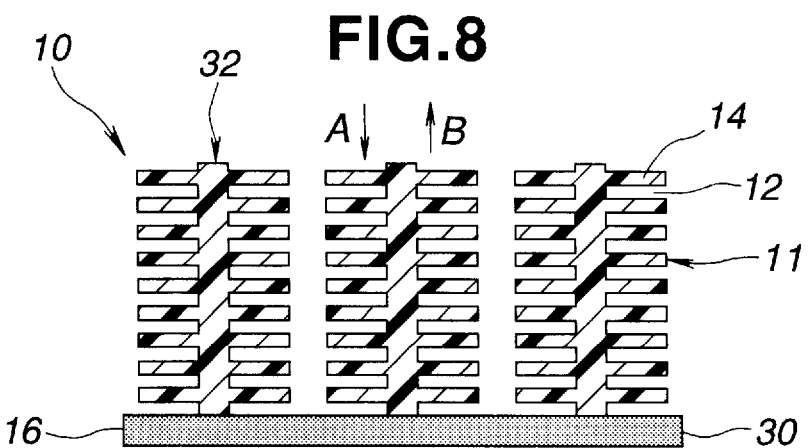
FIG. 8 is a view similar to FIG. 7, but showing another minute structure having a plurality of minute units having a plurality of solid layers and a plurality of layers of void spaces filled with air.
Figure 9:
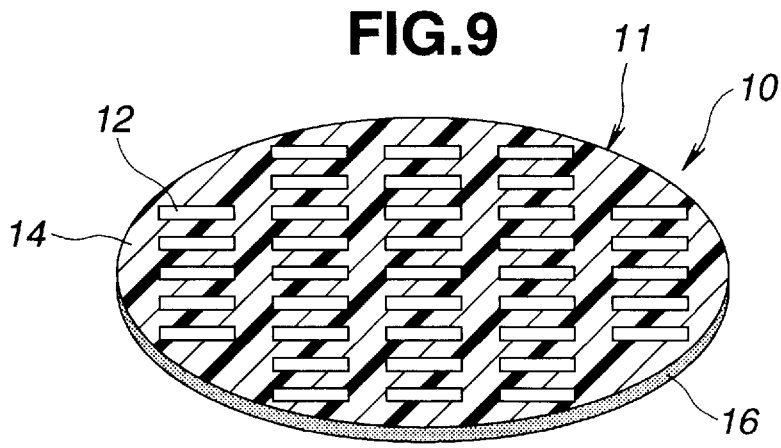
FIG. 9 is a view similar to FIG. 7, but showing a perspective view of a section of another minute structure having an elliptical section.
Figure 10:
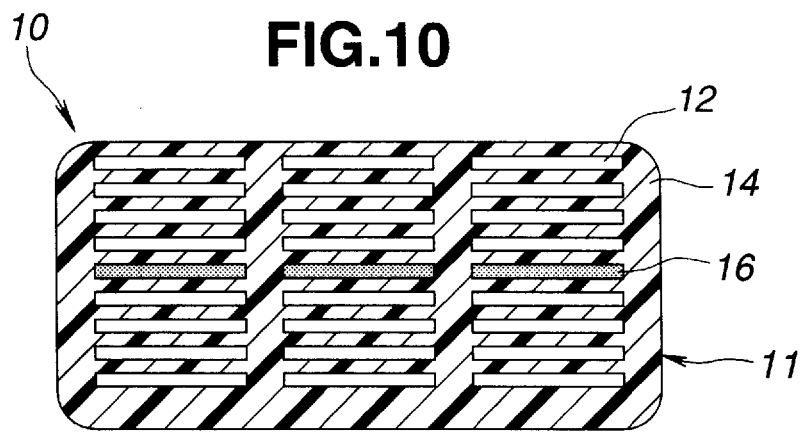
FIG. 10 is a view similar to FIG. 7, but showing another minute structure having the stray-light absorbing member at a middle thereof.
Figure 11:
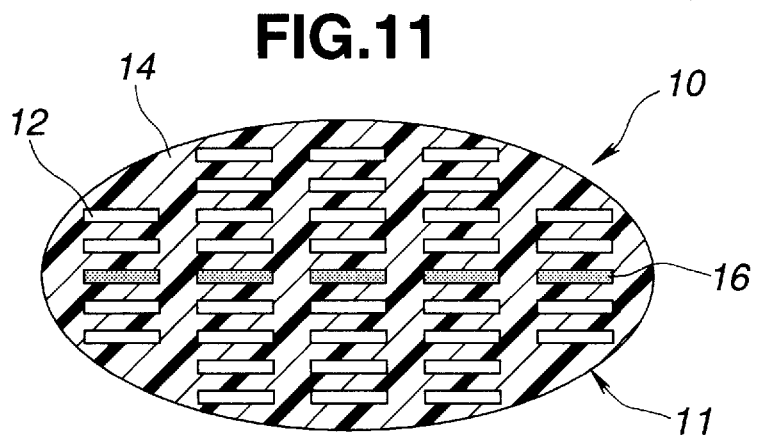
FIG. 11 is a view similar to FIG. 10, but showing another minute structure having an elliptical section.
Figure 12:
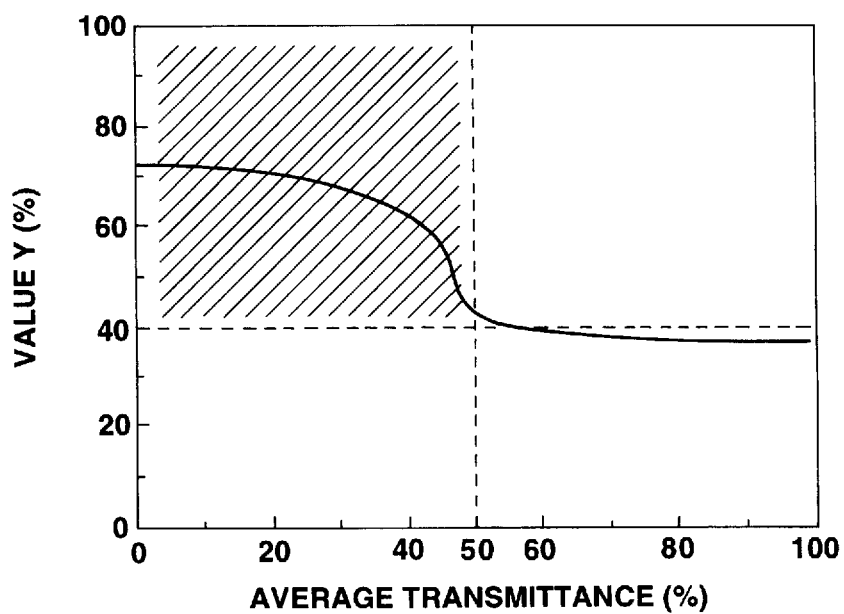
FIG. 12 is a graph showing the effect of the average transmittance, in the visible light region (380–780 nm), of the stray-light absorbing member, on the value of the interference color.
Figure 16:
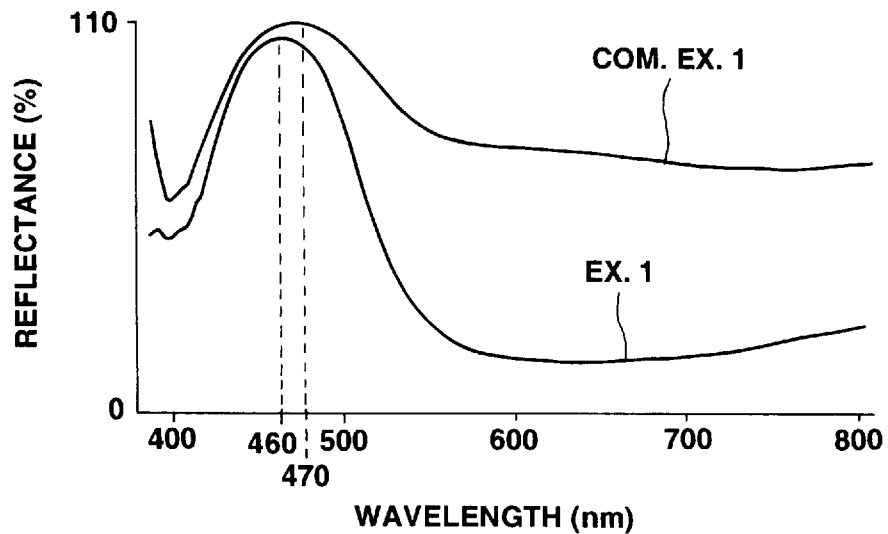
FIG. 16 is a graph showing reflectance spectrums of the minute structures according to Example 1 and Comparative Example 1.

The reflection spectrum of the minute structure was determined with a microspectrophotometer (Model U-6000 of Hitachi Co.) with an incidence angle of 0° along the arrow "A" as shown in FIG. 8 and a light receiving angle of 0° along the arrow "B" as shown in FIG. 8. The result is shown in FIG. 16. As shown in FIG. 16, the reflection spectrum had a high peak at a wavelength of about 460 nm. The value of interference color was about 70%. The color formed by the minute structure was a special blue very bright and deep. The determination of the reflectance was based on the standard white board.

EXAMPLE 2

In this example, a minute structure according to the present invention which is similar to that shown in FIG. 1 was prepared by a method in which Example 1 was slightly modified as follows.

PVDF and PPS were respectively used as high- and low-refractive-index materials. Aniline black was used in place of carbon black. Unlike Example 1, the sheath material (PPS) was not removed by a solvent. The spinning nozzle temperature was 350° C., and the rate of rolling the extrusion round a reel was 250 m/min. The thus prepared minute structure had seven layers of PVDF and seven layers of PPS, wherein both layers were placed on top of each other. Each layer of PVDF had a refractive index of 1.41 and a thickness of 0.1 $\mu$m. Each layer of PPS had a refractive index of 1.82 and a thickness of 0.08 $\mu$m. The bottom portion (the stray-light absorbing member) of the minute structure contained a certain amount of aniline black such that the average transmittance of the bottom portion in the visible light region (380–780 nm) was 30%.

Figure 17:
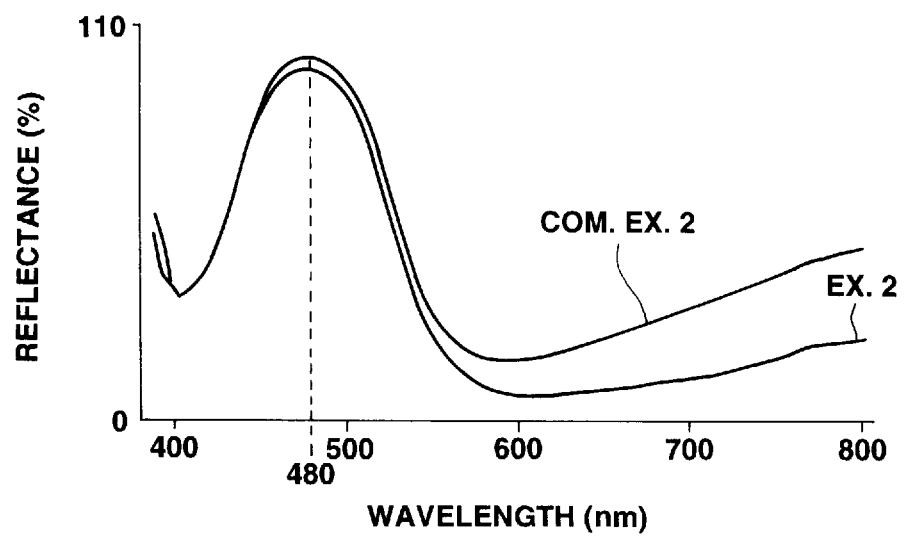
FIG. 17 is a graph showing reflectance spectrums of the minute structures according to Example 2 and Comparative Example 2.

The reflectance spectrum was determined by the same method as that of Example 1. The result is shown in FIG. 17. As shown in FIG. 17, the spectrum had a high peak at a wavelength of about 480 nm. The value of interference color was about 55%.

COMPARATIVE EXAMPLE 1

In this comparative example, Example 1 was repeated except in that carbon black was omitted. Therefore, the bottom portion of a minute structure was not the stray-light absorbing member. The reflectance spectrum is shown in FIG. 16. As shown in FIG. 16, the reflectance spectrum had a high peak at a wavelength of about 470 nm. However, this peak (curved portion) was much broader than that of Example 1, and the base line of the reflectance spectrum was much higher than that of Example 1. Thus, the value of interference color was about 38% which was much lower than that of Example 1.

COMPARATIVE EXAMPLE 2

In this comparative example, Example 2 was repeated except in that aniline black was omitted. Therefore, the bottom portion of a minute structure was not the stray-light absorbing member. The reflectance spectrum is shown in FIG. 17. As shown in FIG. 17, the reflectance spectrum had a high peak at a wavelength of about 480 nm. However, the base line of the reflectance spectrum in the region of longer wavelength (higher than about 600 nm) was much higher than that of Example 2. Thus, the value of interference color was about 40% which was much lower than that of Example 2.

EXAMPLE 3

In this example, a plain weave fabric which is similar to that shown in FIG. 13 was prepared from first threads made of the laminated portion and second threads made of the stray-light absorbing member, as follows. The first and second threads were prepared in a similar method as that of Example 1, as follows.

At first, PET chips for a high-refractive-index material and PP chips for a low-refractive-index material were respectively put into first and second hoppers of a melt spinning machine. Then, all of these chips were melted and extruded at the same time from a single united nozzle having a special shape to get one filament. Then, the extrusion (filament) was drawn, and then was allowed to stand still to cool down. With this, the first thread made of the laminated portion was obtained. The first thread had an elliptical section. The laminated portion had eight layers of PET and nine layers of PP. Each layer of PET had a refractive index of 1.68 and each layer of PP had a refractive index of 1.48.

Separately, PET chips containing a certain amount of carbon black was put into a hopper of a melt spinning machine. Then, the PET chips were melted and extruded from a nozzle having a special shape to get one filament. Then, the extrusion was drawn, and then was allowed to stand still to cool down. With this, the second thread made of the stray-light absorbing member was obtained. The second thread had also an elliptical section. The second thread had the certain amount of carbon black such that the first thread had an average transmittance of 20% in the visible light region (380–780 nm).

The plain weave fabric was prepared from the first and second threads by a conventional plain weave method. The obtained plain weave fabric had a bright blue color and a dark black color. The tone and depth of the color of the fabric varied locally with a change of angle of viewpoint.

What is claimed is:

1. A minute structure for showing an interference color having a wavelength within a visible light region, by reflection and interference of a natural light incident on the minute structure, said structure comprising:

a laminated portion for showing the interference color, said laminated portion including a plurality of first layers having a first refractive index and a plurality of second layers having a second refractive index different from the first refractive index, said first and second layers being alternately placed on top of each other; and means for absorbing a stray light, said stray light having wavelengths other than the wavelength and being formed by transmittance of the natural light through said laminated portion, reflectance of the natural light by said laminated portion and/or scattering of the natural light by said laminated portion, said stray-light absorbing means having a transmittance which is smaller for the wavelength of the interference color than for other wavelengths.

2. A minute structure for showing an interference color having a wavelength within a visible light region, by reflection and interference of a natural light incident on the minute structure, said structure comprising:

a laminated portion for showing the interference color, said laminated portion including a plurality of first layers having a first refractive index and a plurality of second layers having a second refractive index different from the first refractive index, said first and second layers being alternately placed on top of each other; and means for absorbing a stray light, said stray light having wavelengths other than the wavelength and being formed by transmittance of the natural light through said laminated portion, reflectance of the natural light by said laminated portion and/or scattering of the natural light by said laminated portion, wherein said stray-light absorbing means has an average transmittance not higher than 50% in the visible light region.

3. A minute structure according to claim 2, wherein said stray-light absorbing means has an average transmittance not higher than 30% in the visible light region.

4. A minute structure according to claim 1, wherein each of said first layers is made of a material selected from the group consisting of polypropylene and polyvinylidene fluoride.

5. A minute structure according to claim 1, wherein each of said second layers is made of a material selected from the group consisting of polyethylene terephthalate and polyphenylene sulfide.

6. A minute structure according to claim 1, wherein each of said first and second layers is made of a material selected from the group consisting of polyester, polyacrylonitrile, polystyrene, nylon, polypropylene, polyvinyl alcohol, polycarbonate, polymethyl methacrylate, polyether ether ketone and polyparaphenylene terephthalide.

7. A minute structure according to claim 1, wherein said stray-light absorbing means is made of a material selected from the group consisting of a colored polymer resin, a polymer resin containing an organic or inorganic pigment, and a polymer resin coated with a colored ceramic.

8. A minute structure according to claim 7, wherein said organic or inorganic pigment is selected from the group consisting of melanine, aniline black and carbon black.

9. A minute structure according to claim 1, wherein each of said first layers is made of air and each of said second layers is made of a solid object, and wherein each of said first layers has a refractive index of 1.0 and each of said second layers has a refractive index within a range from 1.2 to 1.8.

10. A minute structure according to claim 1, wherein each of said first layers is made of a solid object and each of said second layers is made of another solid object, and wherein each of said first layers has a first refractive index of at least 1.3 and each of said second layers has a second refractive index such that the ratio of the second refractive index to the first refractive index is within a range from 1.1 to 1.4.

11. A minute structure for showing an interference color having a wavelength within a visible light region, by reflection and interference of a natural light incident on the minute structure, said structure comprising:

a layer for showing the interference color, said layer including at least two members that are opposed to each other, with an interposal of a void space filled with air, and a connecting member for connecting said at least two members with each other, said void space having a thickness that is defined between said at least two members and is in a range of 0.02 µm–0.4 µm; and means for absorbing a stray light, said stray light having wavelengths other than the wavelength and being formed by transmittance of the natural light through said layer, reflectance of the natural light by said layer and/or scattering of the natural light by said layer.

12. A minute structure for showing an interference color having a wavelength within a visible light region, by reflection and interference of a natural light incident on the minute structure, said structure comprising:

a laminated portion for showing the interference color, said laminated portion including a plurality of layers having a refractive index different from a refractive index of air;

said layers being separated from each other by a plurality of void spaces, said void spaces filled with air and having a thickness in a range of 0.02 µm–0.4 µm; and means for absorbing a stray light, said stray light having wavelengths other than said wavelength within a visible light region and being formed by transmittance of the natural light through said laminated portion, reflectance of the natural light by said laminated portion and/or scattering of the natural light by said laminated portion.

13. A minute structure according to claim 11, wherein said stray-light absorbing means has an average transmittance not higher than 50% in the visible light region.

14. A minute structure according to claim 12, wherein said stray-light absorbing means has an average transmittance not higher than 50% in the visible light region.

15. A minute structure for brightly showing an interference color having a predetermined wavelength within a visible light region, by reflection and interference of a natural light incident on the minute structure, said structure comprising:

a laminated portion for showing the interference color, said laminated portion including a plurality of first layers having a first refractive index and a plurality of second layers having a second refractive index different from the first refractive index, said first and second layers being alternately placed on top of each other; and color brightening means for more brightly showing the interference color by absorbing a stray light, said stray light having wavelengths other than the predetermined wavelength and being formed by transmittance of the natural light through said laminated portion, reflectance of the natural light by said laminated portion and/or scattering of the natural light by said laminated portion, said color brightening means having a reflectance which is greater for the interference color at the predetermined wavelength than for other wavelengths in the stray light.

16. A minute structure according to claim 1, wherein said stray-light absorbing means has an average transmittance not higher than 50% in the visible light region.

* * * * *